(12) United States Patent
Stwertka et al.

(10) Patent No.: US 7,403,708 B2
(45) Date of Patent: *Jul. 22, 2008

(54) TRACKING AN IMAGE-RECORDING MEDIUM USING AN IDENTIFYING MARK AND FILM ENCODEMENT

(75) Inventors: Peter M. Stwertka, Rochester, NY (US); James F. Greenlaw, Rochester, NY (US); Diane M. Carroll-Yacoby, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 929 days.

This patent is subject to a terminal disclaimer.

(21) Appl. No.: 10/700,747

(22) Filed: Nov. 4, 2003

(65) Prior Publication Data

US 2005/0105729 A1   May 19, 2005

(51) Int. Cl.
*G03B 17/24* (2006.01)
(52) U.S. Cl. ........................... 396/310; 352/236
(58) Field of Classification Search ............... 396/310, 396/311; 355/40; 352/236; 700/213, 225
See application file for complete search history.

(56) References Cited

U.S. PATENT DOCUMENTS

| | | | |
|---|---|---|---|
| 3,835,301 A | 9/1974 | Barney | |
| 4,075,018 A | 2/1978 | Custer | |
| 5,266,968 A | 11/1993 | Stephenson | |
| 5,528,222 A | 6/1996 | Moskowitz et al. | |
| 5,534,954 A | 7/1996 | Vetter et al. | |
| 5,751,398 A * | 5/1998 | Beard | 352/236 |
| 5,850,481 A | 12/1998 | Rhoads | |
| 5,875,249 A | 2/1999 | Mintzer et al. | |
| 5,912,972 A | 6/1999 | Barton | |
| 5,949,885 A | 9/1999 | Leighton | |
| 6,031,914 A | 2/2000 | Tewfik et al. | |
| 6,044,156 A | 3/2000 | Honsiger et al. | |
| 6,353,672 B1 | 3/2002 | Rhoads | |
| 7,079,913 B2 * | 7/2006 | Kato et al. | 700/115 |
| 2003/0187679 A1 | 10/2003 | Odgers et al. | |
| 2005/0086480 A1* | 4/2005 | Kerr et al. | 713/176 |
| 2005/0238167 A1* | 10/2005 | Duffield et al. | 380/203 |

FOREIGN PATENT DOCUMENTS

BE    898 036 A1    4/1984

(Continued)

OTHER PUBLICATIONS

TK5550, Temic Semiconductors, Read/Write Transponder, Rev.A1, Apr. 30, 1997.

(Continued)

*Primary Examiner*—W. B. Perkey
(74) *Attorney, Agent, or Firm*—Roland R. Schindler

(57) ABSTRACT

An image-recording medium and methods and apparatuses for providing the image-recording medium are provided. In accordance with the method, the image-recording medium is segmented and at least one identifying mark that identifies each segment of the image-recording medium is provided in an image recording area of the image-recording medium. A tracking encodement is provided that has tracking data that identifies each segment, with each tracking encodement being provided in an area of the image recording medium that does not record images. Information is stored in a database that associates the tracking data in the tracking encodement with the identifying mark.

45 Claims, 10 Drawing Sheets

FOREIGN PATENT DOCUMENTS

| | | |
|---|---|---|
| DE | 37-07 608 A1 | 9/1988 |
| FR | 2 717 590 | 9/1995 |
| WO | WO 94/06116 | 3/1994 |
| WO | WO 01/35163 | 5/2001 |
| WO | WO 2005/027500 | 3/2005 |

OTHER PUBLICATIONS e5550, Temic Semiconductors, Standard Read/Write Identification IC, Rev.A3, Mar. 17, 1998.

HID Corp., Multi-Technology Card Guide, date unknown.

Atmel Smard Card ICs, Silicon Solution Making Smart Cards Smarter, date unknown.

Atmel.Read-Only Transponder, TK5530, Rev.A5, Dec. 19, 2001.

Philips Semiconductors, mifare Standard Card IC, MF1 IC S50 Functional Specification, Revision 5.1, date unknown.

Texas Instruments, Radio Frequency Identificatin Systems, Tag-It, Moving Concepts to Reality, date unknown.

Tiris Technology by Texas Instruments, Making RFID work for you, Open Forum, date unknown.

The Cutting Edge of RFID Technology and Applications for Manufacturing and Distribution by Sysy d'Hont, Texas Instrument TIRIS, date unknown.

White Paper—doc center, Latest Generation Technology for Immobilizer Systems, Dipl-Ing. Michael Knebelkamp, Dipl-Ing. Herbert Meier, Freising, date unknown.

* cited by examiner

TRACKING AN IMAGE-RECORDING MEDIUM USING AN IDENTIFYING MARK AND FILM ENCODEMENT

CROSS REFERENCE TO RELATED APPLICATIONS

Cross reference is made to related application Ser. No. 10/662,220 entitled "Tracking An Image-Recording Medium Using An identifying mark and Associated Memory" filed in the name of Kerr et al. on Sep. 12, 2003.

FIELD OF THE INVENTION

The present invention relates, in general, to image-recording media and more specifically to methods and apparatuses for tracking the processing and use of a segment of an image-recording film.

BACKGROUND OF THE INVENTION

Illegal copying of motion pictures is a cause of substantial revenue loss to the motion picture industry. Illegal copies made from a film print of a motion picture are typically made using a sophisticated telecine apparatus or filmed during projection using a video camera. Even the questionable quality of motion pictures pirated in this fashion does not prevent them from broad distribution in the "black market", especially in some global markets and on the Internet. As video cameras improve in imaging quality and become smaller and more capable, the threat of illegal copying activity becomes more menacing to motion picture providers. While it may not be possible to completely eliminate theft by copying, it can be advantageous to provide forensic techniques that help to determine where and how an illegal copy of a motion picture was made.

It is known to provide a distinct symbol or identifying mark to an original still image as a means of image or copy identification, such as in order to authenticate a copy. As examples, U.S. Pat. No. 5,875,249 entitled "Invisible Image Identifying mark For Image Verification filed by Mintzer et al. on Jan. 8, 1997; U.S. Pat. No. 6,031,914 entitled Method and Apparatus Embedding Data, Including Identifying marks, In Human Perceptible Images, filed by Tewfik et al. on Aug. 27, 1997; U.S. Pat. No. 5,912,972 entitled Method and Apparatus For Embedded Authentication Information Within Digital Data filed by Barton on Jun. 15, 1999; and U.S. Pat. No. 5,949,885 entitled Method For Protecting Content Using Identifying marking filed by Leighton on Aug. 29, 1997, disclose methods of applying a perceptually invisible identifying mark to image data as verification of authorship or ownership or as evidence that an image has not been altered. Advanced steganographic or "hidden content" techniques used for embedding identifying marks and other information content within images are also disclosed in commonly assigned U.S. Pat. No. 6,044,156 entitled Method for Generating An Improved Carrier For Use In An Image Data Embedding Application, filed by Honsinger et al. on Apr. 28, 1997; U.S. Pat. No. 5,850,480, entitled Steganographic System filed by Rhoads on May 8, 1995; and U.S. Pat. No. 6,353,672 entitled Steganographic Using Dynamic Codes filed by Rhoads on Mar. 8, 2000. Embedded identifying marks formed using such techniques, can provide various types of encoded message information, for example, a string of bits.

Identifying marking schemes, such as those disclosed in the patents listed above can be employed to add an identifying mark within the recorded image area of each copy of a motion picture. Proper deployment of such techniques can provide an identifying mark encoding that is imperceptible to the viewer's eye but can be detected when analyzing an illegal copy of a motion picture. Such identifying marks are typically made to be robust, that is, able to withstand various "attacks" that can remove or alter the identifying mark.

To provide accurate tracking of a motion picture print, it is necessary to uniquely identify the distribution path of the print. In fact, for even better precision, there can be advantages in providing multiple identifying marks in a single copy of a motion picture, so that each copy of a motion picture contains at least one individual length or segment of film having a unique, trackable identifying mark. In this way, even an individual segment of film of an illegally copied motion picture could be analyzed, its identifying mark detected, and its processing and distribution history tracked with precision. In order to provide this type of tracking capability, the processing and distribution history for each copy of a motion picture and/or a segment of film must be stored in some accessible fashion, such as in a database, and the identifying mark must be coupled, that is, associated in some way, to the specific information about a segment of film or motion picture that is stored in the database. This type of tracking can be used, for example, to provide forensic data and evidence that can be used to identify and prosecute those making an illegal copy of a motion picture.

In order to appreciate the difficulty involved in tracking the many copies of a motion picture, it is instructive to understand the conventional process by which a motion picture is manufactured, processed, and provided to a theater or other exhibitor. Referring to FIG. 1, there is shown an overview of the prior art process for producing and distributing a motion picture. A media manufacturer 20 initially manufactures film stock known as print film in the form of a large web of un-imaged print film. The web of un-imaged print film is then slit to produce multiple strips of un-imaged print film 22 each of which is then wrapped about a core 24 to produce multiple rolls 26 of un-imaged print film 22. Such un-imaged print film rolls 26 can have up to 6000 feet of un-imaged print film 22; however, they can also be any other convenient length. As un-imaged print film 22 is fabricated by media manufacturer 20, information may be exposed onto the un-imaged print film 22 such as product code, strip number, roll and part number, date or other information. This information is typically exposed on an edge of un-imaged print film 22, outside of an area of un-imaged print film 22 that is to receive scene content. Such information is not accessible until after the un-image film processor 50 processes print film 22.

When a studio 30 authorizes release a motion picture for distribution, a master copy 32 of the motion picture is provided to a printing apparatus 36 at a printing lab 34. Printing apparatus 36 can comprise such as a contact printer. Printing apparatus 36 is used to imprint an image of master copy 32 onto one or more rolls 26 of un-imaged print film 22. Printing apparatus 36 has an exposure head 38 that exposes images from master copy 32 onto un-imaged print film 22 to form an exposed print film 46 that is wound to form an imaged print film reel 48. Master copy 32 may be fed in a continuous loop or fed from a source reel 42 to a take-up reel 44.

Imaged print film reel 48 is taken from printing apparatus 36 and provided to film processor 50 for development using a conventional chemical process that routes exposed print film 46 through a sequence of baths 52 such as a developer bath 52a, a bleach bath 52b, and a fixer bath 52c. After this process, exposed print film 46 is dried to become a developed print film 54. Developed print film 54 is then packaged, for example, by mounting developed print film 54 on reel cores 56, becoming film reels 58 holding a length of developed print film 54 as long as 2000 feet. Typically a motion picture is made up of six to eight film reels 58 that vary in length. However, the number of film reels 58 and the length of developed print film 54 on each of film reels 58 used for a feature film can vary depending on the length of the motion picture.

Film reels 58 are then sent to a distributor 64, also known as a film exchange, who adds reel sides 60 that snap into reel cores 56 to provide protection and integrity to the developed print film 54. Reel sides 60 can alternatively be added at printing lab 34. Film exchange 64 assembles the appropriate film reels 58 to form a package comprising the entire motion picture for distribution to exhibitors 66. Exhibitors 66 typically provide the necessary splicing or handling required to combine the provided reels to display the motion picture.

It must be observed that the sequence shown in FIG. 1 is deliberately simplified for the sake of description and allows a number of variations in actual practice, but should be adequate for an overall understanding of key processes from film manufacture through distribution. Film packaging, for example, may be varied, depending on whether cores 24, reel cores 56, or other support structures are most appropriate. Processes illustrated at printing lab 34 such as printing and developing can all be performed at one location or performed at different locations. The roles of printing lab 34, developer 50 and film exchange 64 can overlap or be combined in many different ways than described or shown in FIG. 1.

With respect to FIG. 1, it can be seen that it is possible to use an identifying mark to uniquely identify each developed print film 54 in a way that the identifying mark can be extracted from an illegal copy of a motion picture recorded on the developed print film 54. However, to use such an identifying mark to identify the origin of illegal copies, the distribution path of the developed print film 54 bearing the identifying mark must be known. This requires that each developed print film 54 be tracked throughout its subsequent processing and distribution. However, as is shown in FIG. 1, the complexity of the film printing, developing and distribution process presents significant traceability challenges. What is needed is a method and system that are capable of building an association between a detected identifying mark and tracking of distribution information for that motion picture. What is also needed is a method and system that are capable of accurately maintaining and updating tracking information for each motion picture print at critical stages of film processing, distribution and exhibition. Such a method and system should be relatively inexpensive, require little labor, and be unobtrusive and difficult to circumvent.

Such a method and system should also be difficult to separate from the print so that the integrity of the tracking system is preserved. To achieve this, non-image information can be recorded on a print film. For example, it has been know to record non-image information optically in a marginal area on a motion picture film print. FIG. 2 shows a plan view of one known arrangement of this type. In the arrangement shown in FIG. 2, audio content is recoded optically in the marginal area in a cyan color channel of the print film. The audio content 65 is presented in a synchronized fashion with the image content recorded in image area 67. Other data such as film source identification information is written in human readable form on other color channels in the same marginal area can be recorded as an edge print 68. Similarly, in consumer negative films, it has been known to use a latent image bar code in a marginal area of a filmstrip that uniquely identifies the consumer negative film. This is done, for example, in consumer negative films that comply with the Advanced Photographic System standards. However, the use of such systems for anti-piracy is not known.

Steganographic methods that involve using a recorded identifying mark to track the movement of an object are known. For example, U.S. Pat. Pub. No. 2000/0006212 entitled "Digital Identifying marking Apparatus and Methods Thereof" describes a method for managing inventory comprising the steps of: digitally identifying marking objects, each identifying mark including a unique identifier; recording the unique identifiers in a database; and updating the database to reflect activity of the marked objects. Similarly, U.S. Pat. App. Pub. No. 2002/0164049 entitled "Emulsion Products and Imagery Employing Steganography" filed by Rhoads on Mar. 19, 2002 describes the use of blank emulsion films and papers with an identifying mark that is then used for tracking purposes.

However, both of these systems require that the identifying mark itself be decoded at each stage in production and distribution wherein tracking is desired. This creates several issues when this technique is applied to motion picture film production and distribution. As an initial matter, this approach requires that each stage in the film production process be capable of reading the marked encodements. The sharing of identifying mark reading techniques and identifying mark reading equipment necessarily involves distribution of equipment and knowledge that can be used to help circumvent the identifying marking system. Further, the task of reading identifying marks during film production can be difficult to achieve at production speeds. Finally, the use of such techniques also prohibits humans and/or conventional optical scanning systems such as bar code reading equipment to be used to obtain tracking information.

Thus, what is needed are methods and systems for tracking the movement of marked film that can be conveniently used at critical stages of producing, distributing and exhibiting a motion picture and that can be reliably used to track movement of a film or film segment used in the production and distribution of a motion picture. What is also needed are methods and systems for tracking the movement of marked film that minimize the extent to which information about identifying mark encodement techniques must be shared throughout the distribution channel.

SUMMARY OF THE INVENTION

In a first aspect of the invention a method for fabricating an image-recording medium is provided. In accordance with the method, the image-recording medium is segmented and at least one identifying mark that uniquely identifies each segment of the image-recording medium is provided in an image recording area of the image-recording medium. A tracking encodement is provided that has tracking data that uniquely identifies each segment, with each tracking encodement being provided in an area of the image recording medium that does not record images. Information is stored in a database that associates the tracking data in the tracking encodement with the identifying mark.

In another aspect of the invention, a method for providing a segment of an image-recording medium is provided. In accordance with the method, the image-recording medium is segmented and at least one identifying mark that uniquely identifies each segment of the image-recording medium is provided in an image recording area of the image-recording medium. A tracking encodement is provided that has tracking data that uniquely identifies each segment, with each tracking encodement being provided in an area of the image recording medium that does not record images. Information is stored in a database that associates the tracking data in the tracking encodement with the identifying mark. The image-recording medium is distributed and information is stored in a database that associates the tracking data, the identifying mark and at least one user to whom the image-recoding medium is distributed.

In still another aspect of the invention, an image-recording medium is provided. The image-recording medium has film substrate organized into more than one segment with each segment having an image receiving area with an image recording area with an identifying mark encoded thereon and with each segment also having a unique tracking encodement recoded on an area of the film substrate that does not record an image, wherein said encodement has tracking data that can be read by users of the image-recording medium and used to assemble a record of the use of the image-recording medium.

In still another embodiment of the invention, an apparatus for forming an image-recording medium is provided. The apparatus comprises an image recording medium fabrication system adapted to form an image-recording medium said system having a marking encoder that provides a unique identifying mark on more than one segment of an image recording portion of the image-recording medium. A tracking encodement system provides a unique tracking encodement having tracking data on each segment on the image-recording medium; and a controller that stores the tracking data in association with the identifying mark in a database.

In yet another embodiment of the invention, an apparatus is provided for forming an image-recording medium. The apparatus has a image-recording medium fabrication system for forming the image recording medium, an identifying mark encoding system for recording a uniquely identifying mark in a human imperceptible form within a recorded image area on the image-recording medium and a controller adapted to cause a tracking encoder to record a human perceptible tracking encodement from which tracking data can be determined, said tracking encodement being recorded on a portion of the image-recording medium that is not within the image-recording area of the image recording medium. Wherein the controller further stores information in a database that associates the tracking data with the identifying mark recorded in the image area.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, an apparatus in accordance with the invention. It is to be understood that elements not specifically shown or described may take various forms well known to those skilled in the art.

While one embodiment of the present invention is directed to photographic film media processing and tracking, the method of the present invention could be used with image-recording media in general, such as with magnetic or optically encoded media, for example.

Processing Adaptations for Identifying Mark Tracking

Figure 3:
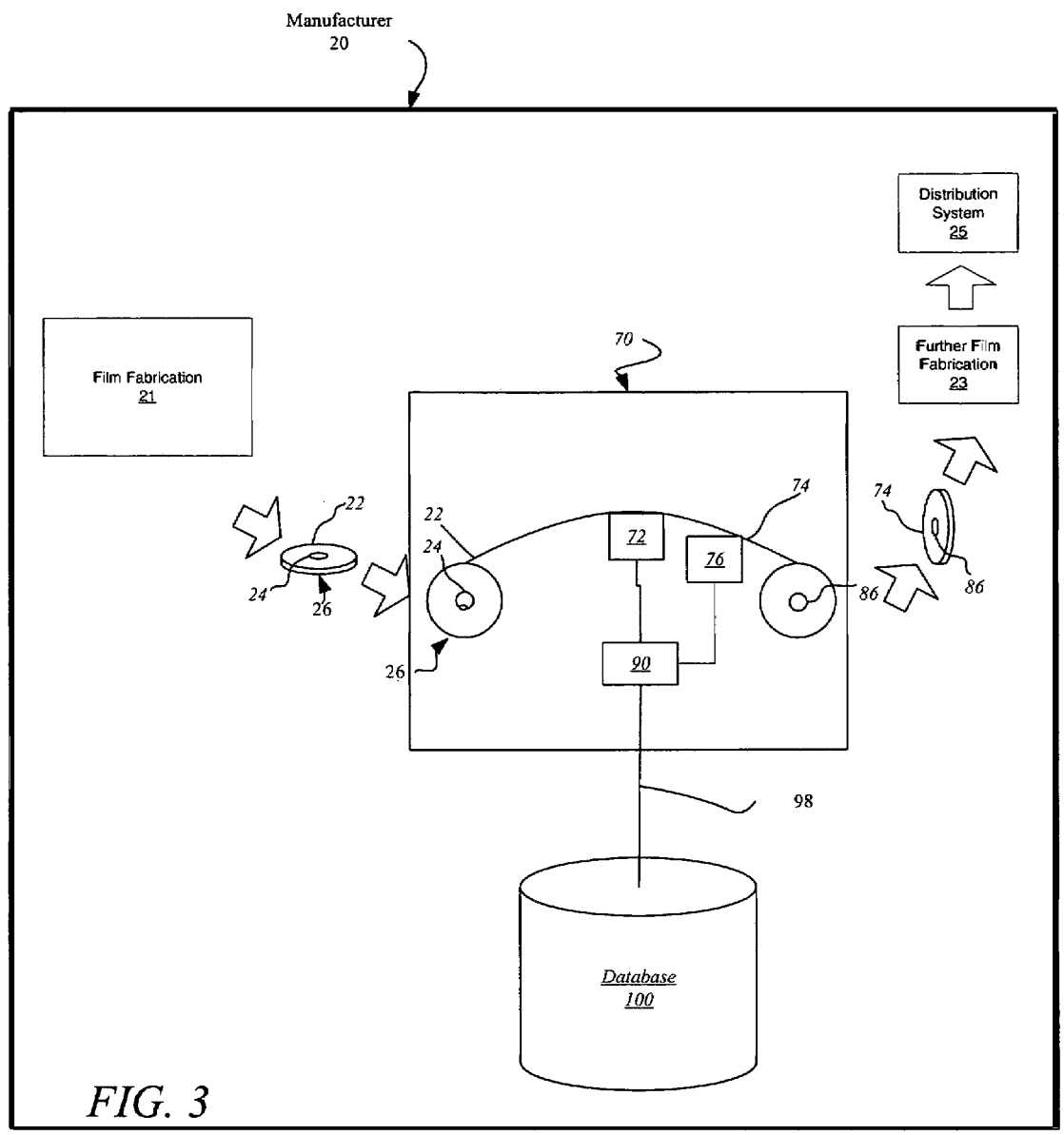
FIG. 3 is a block diagram showing processing of an image-recording medium in a latent image printer according to the present invention.

Referring now to FIG. 3 there is shown a procedure for forming and distributing a marked print film 74. A film fabrication system 21 at manufacturer 20 form an un-imaged print film 22 using known processes for forming such films. The un-imaged print film 22 is then wound on core 24 to form an un-imaged print film roll 26. As is shown in FIG. 3, un-imaged print film roll 26 is loaded into marking encoder system 70 that uses an identifying marking recorder device 72 to form an identifying mark on un-imaged print film.

The processing sequence shown in FIG. 3 moves from left to right. As shown, as un-imaged print film 22 on core 24 is fed through identifying mark exposure device 72 to expose an identifying mark on un-imaged print film 22. Control logic unit 90 controls the operation of identifying mark exposure device 72 and causes at least one identifying mark to be recorded onto un-imaged print film 22. Optionally, control logic unit 90 can cause multiple identifying marks to be recorded on un-imaged print film 22. This can be used, for example, to record a different identifying mark on separate segments of un-imaged print film 22.

Figure 4:
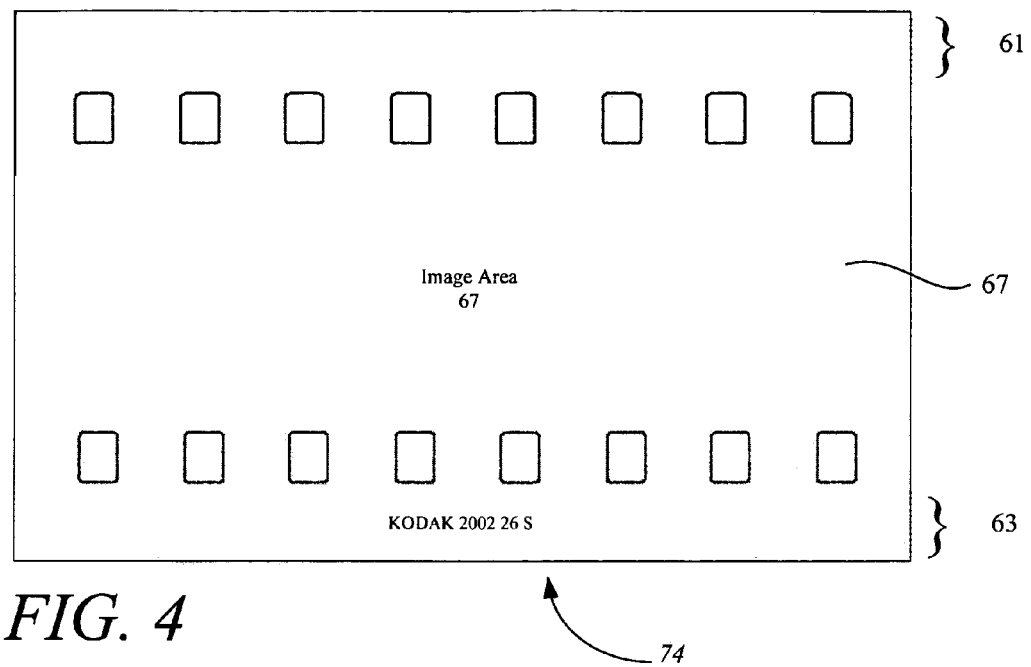
FIG. 4 is a plan view of an un-imaged film.
Figure 5:
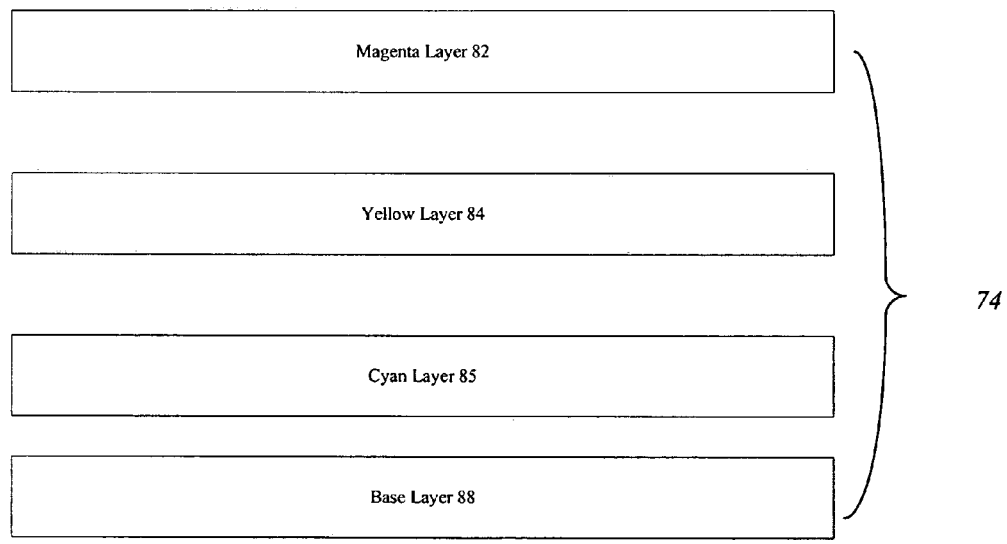
FIG. 5 is a section view of the un-imaged film of FIG. 4.

FIGS. 4 and 5 depict respectively a plan view of un-imaged film 22 and a cross sectionview of un-imaged film 22. As is shown in FIGS. 4 and 5 motion picture print film 22 comprises a series of photosensitive color layers, shown in this embodiment, as a magenta layer 82, a cyan layer 84 and a yellow layer 85 resting on a base layer 88. Each color layer is particularly photosensitive to light that is within a range of wavelengths. In this way, each color layer captures a part of the visible spectrum and, when viewed in combination a full range of human visible colors can be reproduced.

Figure 6:
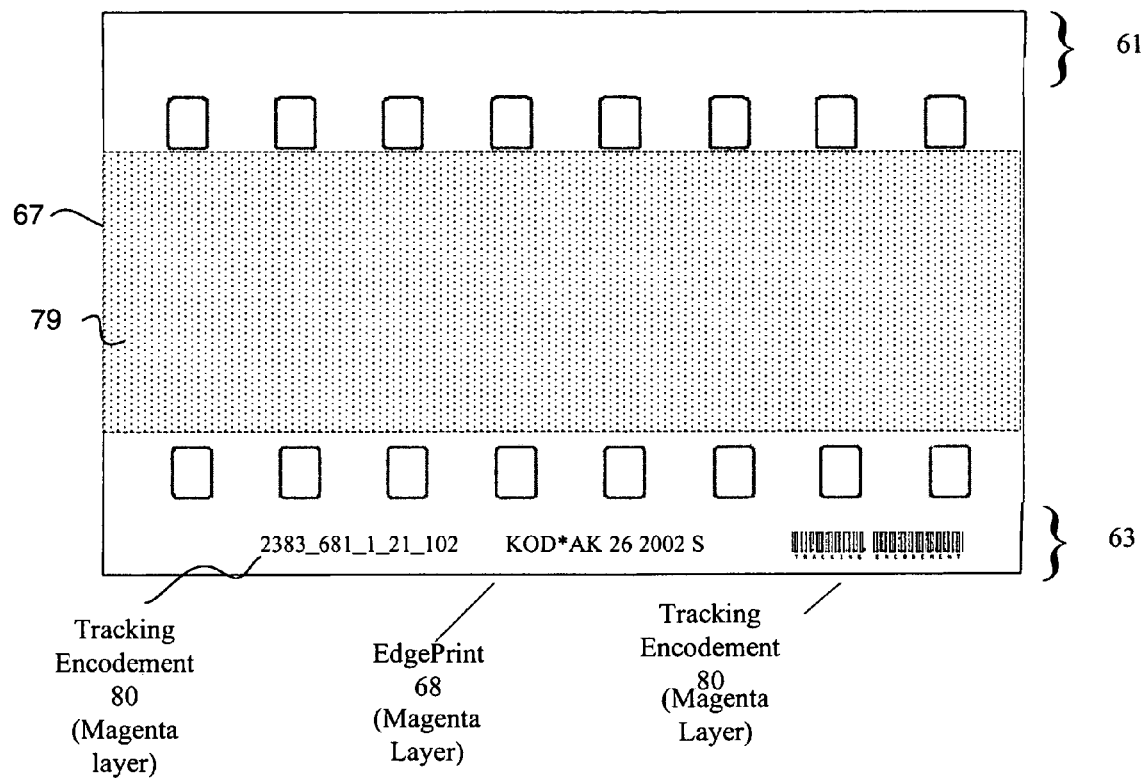
FIG. 6 shows an embodiment of a marked film having a tracking encodement thereon.

Identifying mark exposure device 72 can use any of a number of marking technologies for providing an identifying mark on un-imaged print film 22, so that un-imaged print film 22 becomes a marked print film 74, one embodiment of which is shown in FIG. 6. For example, identifying mark exposure device 72 can form an identifying mark 79 using exposure radiation, which can be used to form a latent image in one or more of the color layers. Alternately, identifying mark exposure device 72 can form an identifying mark by applying a colorant such as ink or dye, punching holes in the un-imaged print film 22, embossing un-imaged print film 22, or using other techniques to form identifying mark 79 on un-imaged print film 22. In the embodiment shown in FIG. 3, identifying mark 79 is formed prior to printing scene content.

However, in alternative embodiments, an identifying mark 79 could alternatively be applied at other points in the print film manufacture. For example, media manufacturer 20 could form an identifying mark during print film fabrication. One advantage of such an approach is that location of identifying mark 79 can be easily and precisely synchronized with the placement of perforations in the image recording medium.

In the embodiment shown in FIG. 6, a general location for identifying mark 79 is illustrated. This general location coincides with the image-recording area 67 of marked film 74. However identifying mark 79 can comprise any size and be located in any portion of image-recording area 67 so long as identifying mark 79 will be incorporated in at least a portion of the image content that is recorded in image-recording area 67 and therefore reproduced during exhibition of film 22. As used herein, the term identifying mark encompasses any type of identifying mark that can be used to differentially identify any segment of an image recording medium such as marked film 74 from another such segment. Identifying mark 79 can be visually imperceptible to a human or can be perceptible.

Identifying mark 79 and/or combinations of identifying marks 79 that are recorded on marked print film 74 are intended to identify each segment of marked print film 74 with sufficient uniqueness to permit use in the tracking of the marked print film 74. However, to provide the traceability necessary for anti-piracy, it is necessary to determine which copy of a motion picture that is later recorded on marked print film 74 has been used to make an unauthorized copy of the motion picture. This requires that a record be made of each entity that processes, distributes and exhibits a motion picture print made using marked print film 74.

Accordingly, in the embodiment of FIGS. 3-6, control logic unit 90 also causes tracking encoder device 76 to optically record a tracking encodement 80 on film 22. In one alternate embodiment, manufacturer 20 can record identifying mark 79 and/or tracking encodement 80 during film fabrication. In another alternate embodiment marking encoder system 70 uses an identifying marking recorder device 72 to record tracking encodement 80 on an un-imaged film 22 using any of the techniques described above. A separate tracking encoder system (not shown) can also be used so long as correspondence between an identifying mark 79 recorded on marked film 74 and the tracking encodement 80 are maintained. In one embodiment, both of identifying mark 79 and tracking encodement 80 are synchronized using film perforations.

In still another embodiment, the marking encoder system 70 can comprise a system that adjusts the way in which film fabrication system 21 forms un-imaged film 22 with such adjustments being used to create artifacts un-imaged film 22 that act as an identifying mark 79 or tracking encodement 80. For example, the photosensitivity, density, grain size and other characteristics of color layers 82, 84, and 85 can be adjusted to form either identifying mark 79 or tracking encodement 80.

Tracking encodement 80 provides tracking data that can be used to associate an identifying mark 79 or combination of identifying marks 79 recorded on marked print film 74 with individual processors, distributors, and exhibitors, and others who process or handle marked print film 74 during the formation and use of a motion picture print made therefrom. Tracking encodement 80 is recorded in a perceptible form that can be read by conventional machine data readers such as bar code readers, or optionally, also by humans. This relieves the need to share information about confidential identifying marking techniques with a broad class of users while still providing the traceability and detectability necessary for anti-piracy. As used herein, the term tracking data is used to describe any information recorded in association with marked print film 74 that can be used to traceably separate one segment of marked print film 74 from another segment of marked print film 74. The tracking data can comprise, for example, a segment identification such as a segment identification number that can be used to traceably separate one segment marked print film 74 from another. It will be appreciated that segment comprises a finite length of a marked print film 74 and that a single motion picture film will contain many segments.

Because tracking encodement 80 containing the tracking data is optically recorded on marked print film 74, tracking encodement 80 travels with marked print film 74 during subsequent stages of film processing and use and is not separable therefrom. Further, tracking encodement 80 is optically readable using conventional equipment and/or conventional equipment with minor and inexpensive modifications.

It will be appreciated, that while tracking encodement 80 can take any number of forms, there are practical design considerations that influence the form of the tracking encodement. As an initial matter, tracking encodement 80 is preferably recorded on marked film 74 in a manner that does not noticeably influence the appearance of the recorded image, the detectabilty of identifying mark 79 and/or other metadata encodements such as conventional audio content (not shown) that are recorded in the cyan channel of marginal areas 61 and 63. Further, it will be appreciated that the process of forming prints of motion picture films is often a fast paced process with many thousands of feet of film being processed per minute. Thus, tracking encodement 80 should preferably also be made in a manner that allows the encodement to be read and tracking data obtained therefrom using automated scanning systems such as bar code readers that can accurately read the tracking encodement at high continuous speeds.

Marking encoder system 70 can perform identifying marking encodement as a final stage before distribution of un-imaged print film 22 by a film distribution system 25 at manufacturer 20, or alternatively, before further fabrication 23 is performed. Examples of such further fabrication include adding additional layers of film material, forming perforations 62 for un-imaged film 22 and/or packaging un-imaged film 22.

As is shown in FIG. 6, in one embodiment, the tracking encodement 80 is recoded using a bar code format that is recorded for example in marginal area 63. This allows for easy machine reading of the tracking encodement at later stages in the use and processing of marked film 74. Other formats can be used, for example a human and machine readable text form of tracking encodement 80 is also shown in FIG. 6. Other convenient codes can also be used.

Further, in the embodiment of FIG. 6, tracking encodement 80 is recorded using a color that does not interfere with potential sound encodements (not shown) that can be made in marginal area 61 and 63. For example, because it is known that sound encodements (not shown) will be made in the cyan color layer 85, other colors that have little impact on the cyan color layer 85 can be used to record tracking encodement 80. For example, tracking encodement 80 can be recorded as a latent image in color layers such as the yellow layer 85 or magenta layer 82 on a layered color film such as the un-imaged film 22 of FIGS. 4 and 5. Alternatively, tracking encodement 80 can be recorded by applying an ink, colorant, dye, donor thermal material or coating to un-imaged film 22 having a color that will not interfere with the potential sound encodements (not shown) made in cyan color layer 85. In still another alternative, the tracking encodement 80 can be recorded using materials such as inks and thermal donors that can be detected without passing light through the marked film 74.

Control logic unit 90 stores data in a database system 100 associating each identifying mark 79 recorded on marked print film 74 with a tracking encodement 80 that uniquely identifies the segment of marked print film 74. Control logic unit 90 can also generate other data and can store this other data in database system 100. An optional network connection 98 provides communication between control logic unit 90 and database system 100. Using the tracking data stored in database system 100, it becomes possible to use tracking encodement 80 detected in a copy of a marked film print 74 to determine how the marked film print 74 was processed and distributed, or to obtain other useful information associated with the marked print film 74.

For the purposes of the present invention, tracking encodement 80 is optional until identifying mark 79 is applied. That is, there may be only limited advantage to tracking an un-imaged print film 22 not yet bearing identifying mark 79 in some applications. However, after identifying mark 79 is exposed or otherwise provided to form a marked print film 74, a tracking encodement 80 should be associated with marked print film 74 as soon as possible in the production process to avoid potential errors in correspondence between the tracking encodement 80 and the identifying mark 69.

Figure 7:
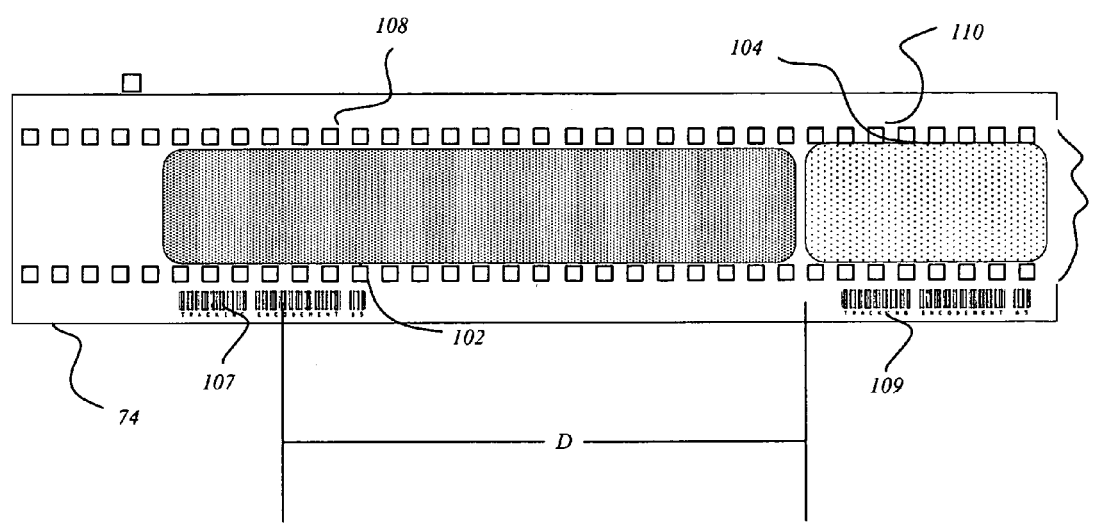
FIG. 7 shows an embodiment of an image recording medium having multiple identifying marks and a tracking encodement thereon.

Referring to FIG. 7, there is shown a plan view of a marked print film 74 having two identifying marks 102 and 104, spaced apart by a distance D. With this arrangement, each identifying mark 102 and 104 is associated with a corresponding one of segment 108 and segment 110, respectively. As noted above, there are numerous different possible identifying mark arrangements including the use of multiple identifying marks within the same media segment 110 or other media segments. For example, multiple occurrences of an identifying mark such as identifying mark 102 can be incorporated within a media segment such as media segment 110 to help provide easier detection. Similarly, multiple occurrence of tracking encodements 107 and 109 are provided on marked print film 74, with each occurrence of an identifying mark associated with an occurrence of a tracking encodement.

Optionally, multiple different identifying marks can be recorded on each media segment. For example, each such different identifying mark can be recorded using a different identifying marking technique. The different identifying marks in each segment can be associated with unique tracking encodements, or, alternatively a single tracking encodement can be provided for each segment. Other such arrangements are possible so long as each identifying mark recorded on a segment is uniquely associated with the tracking encodement for that segment.

Segments such as segments 108 and 110 can be any desired length, as best suits the need for accuracy and detection. In one embodiment, for example, a typical marked print film 74 used to form a motion picture print that is provided to an exhibitor 66 can comprise more than 20 successive segments such as segments 108 and 110.

Identifying marks such as identifying mark 102 and identifying mark 104 can be formed onto media segments such as segment 108 and segment 110 using any suitable spatial arrangement, orientation, rotation, or separation distance. For example, identifying marks such as identifying marks 102 and 104 and tracking encodements such as tracking encodements 107 and 109 can be spaced regularly or spaced at uneven intervals, or could even be contiguous.

Figure 1:
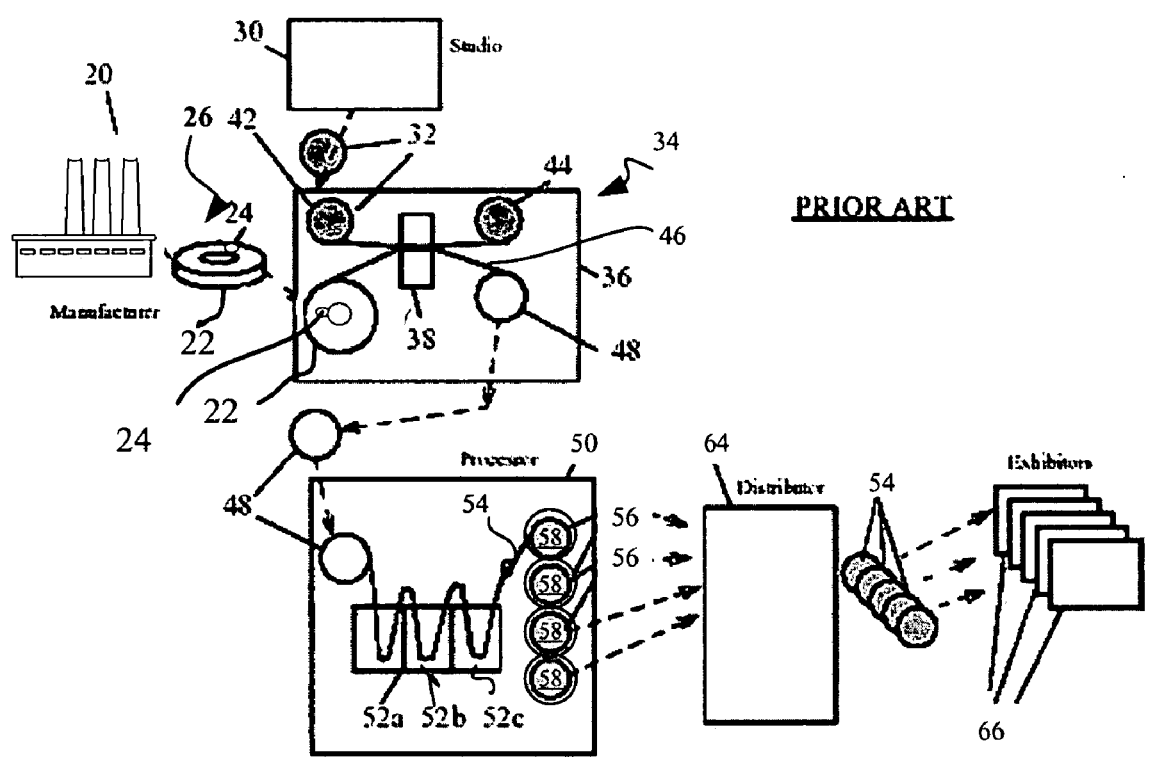
FIG. 1 is an overview block diagram showing the prior art sequence for film processing and distribution, following manufacture.
Figure 2:
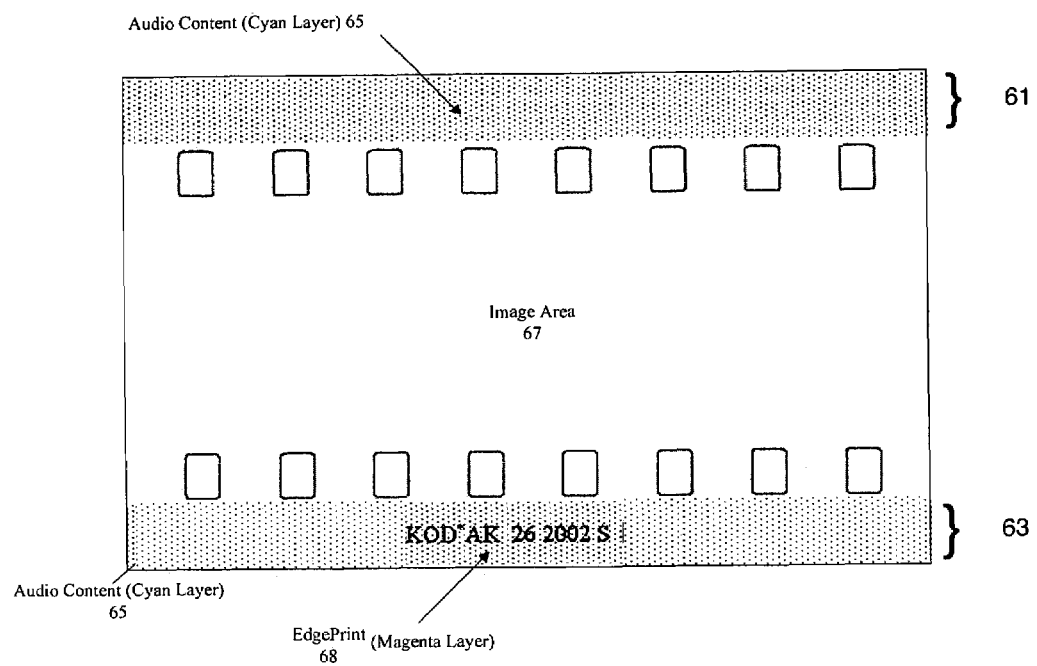
FIG. 2 shows a plan view of a prior art image-recording medium having optically encoded information recorded thereon.
Figure 8:
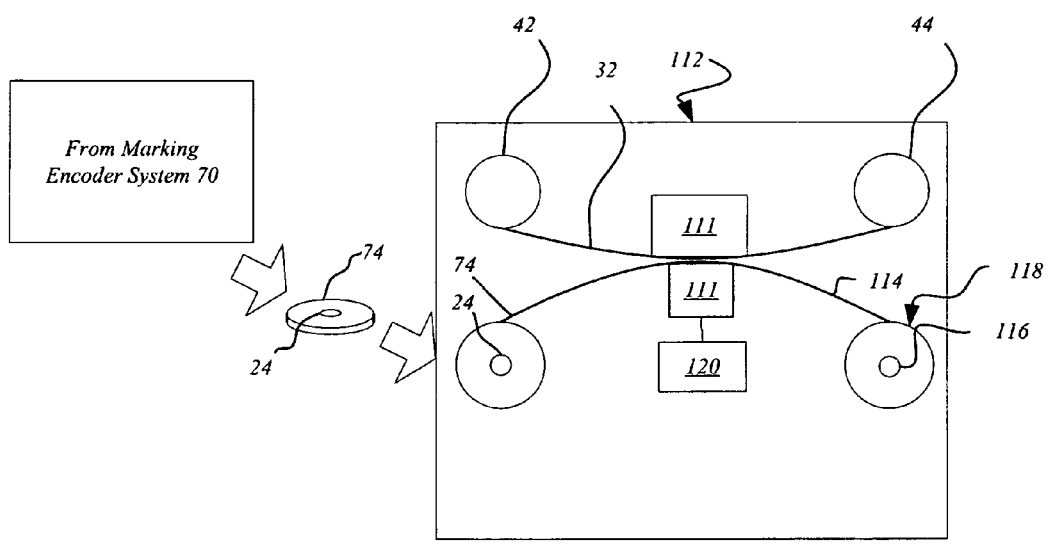
FIG. 8 is a block diagram showing a printer for copying images on to an image recording medium.
Figure 9:
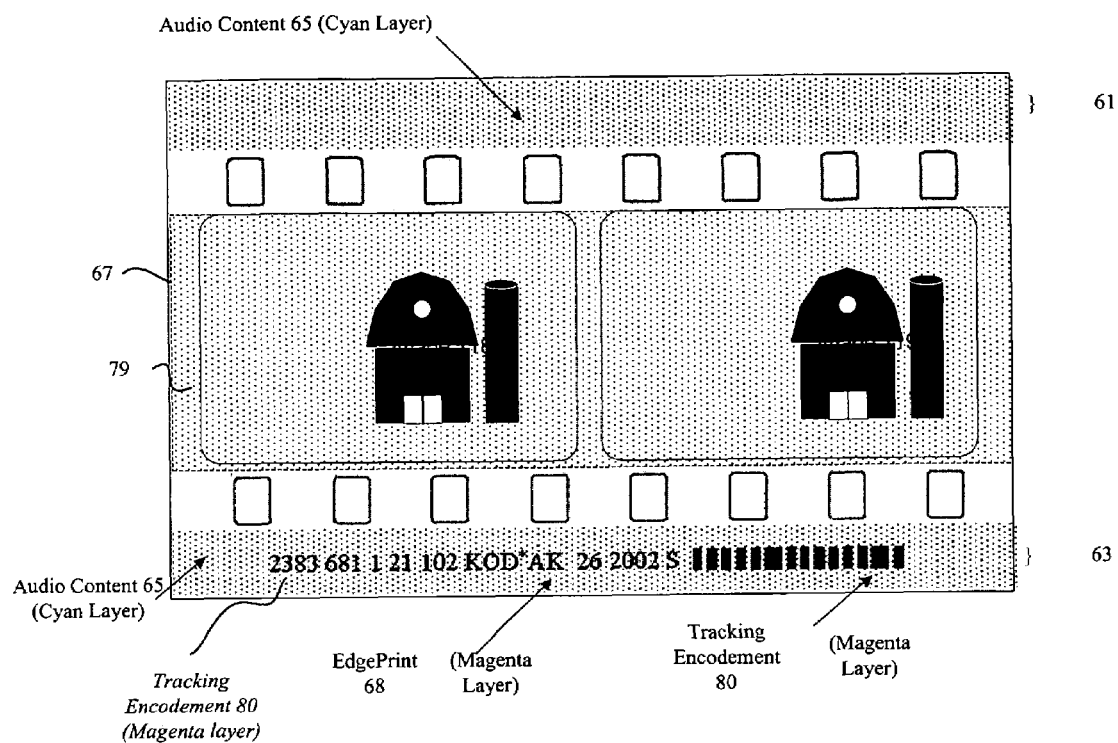
FIG. 9 is a block diagram showing a marked, imaged film having audio signals and a tracking encodement recorded thereon.

Referring to FIG. 8, there is shown a process for printing marked print film 74 using a printing apparatus 112. In a similar sequence to that described earlier with reference to printing onto un-imaged print film 22 in FIG. 1, marked film 74 in FIG. 8 is exposed by a printing head 111 which uses a master copy 32 to imagewise modulate light from a source so that a copy of the image content on master copy 32 is formed on marked film 74. A printer controller 120 controls printing head 111. The image content is recorded in image area 67. As a result of this printing process an exposed marked film 114 shown in FIG. 9 is formed. Exposed marked film 114 is then stored on exposed film core 116 to form exposed film roll 118.

In embodiments where tracking encodement 80 can be recorded using materials such as inks and thermal donors that can be detected without passing light through the marked film 74, or where light can be passed through the marginal area in which tracking encodement 80 is recorded without interference with recorded information therein, printing apparatus 112 can use a reader 122 that detects the tracking encodement 80 and extracts the tracking data therefrom. Printer controller 120 can then use the tracking data to communicate with database 100 to provide information indicating the use of the marked film 74 by printing apparatus 112. This provides valuable tracking information that can later be used for anti-piracy investigations. Further, printer controller 120 can optionally use the tracking data to obtain other information from database 100 that can be used by printer controller 120 to adapt the printing process based upon specific characteristics of the marked film 74.

Figure 10:
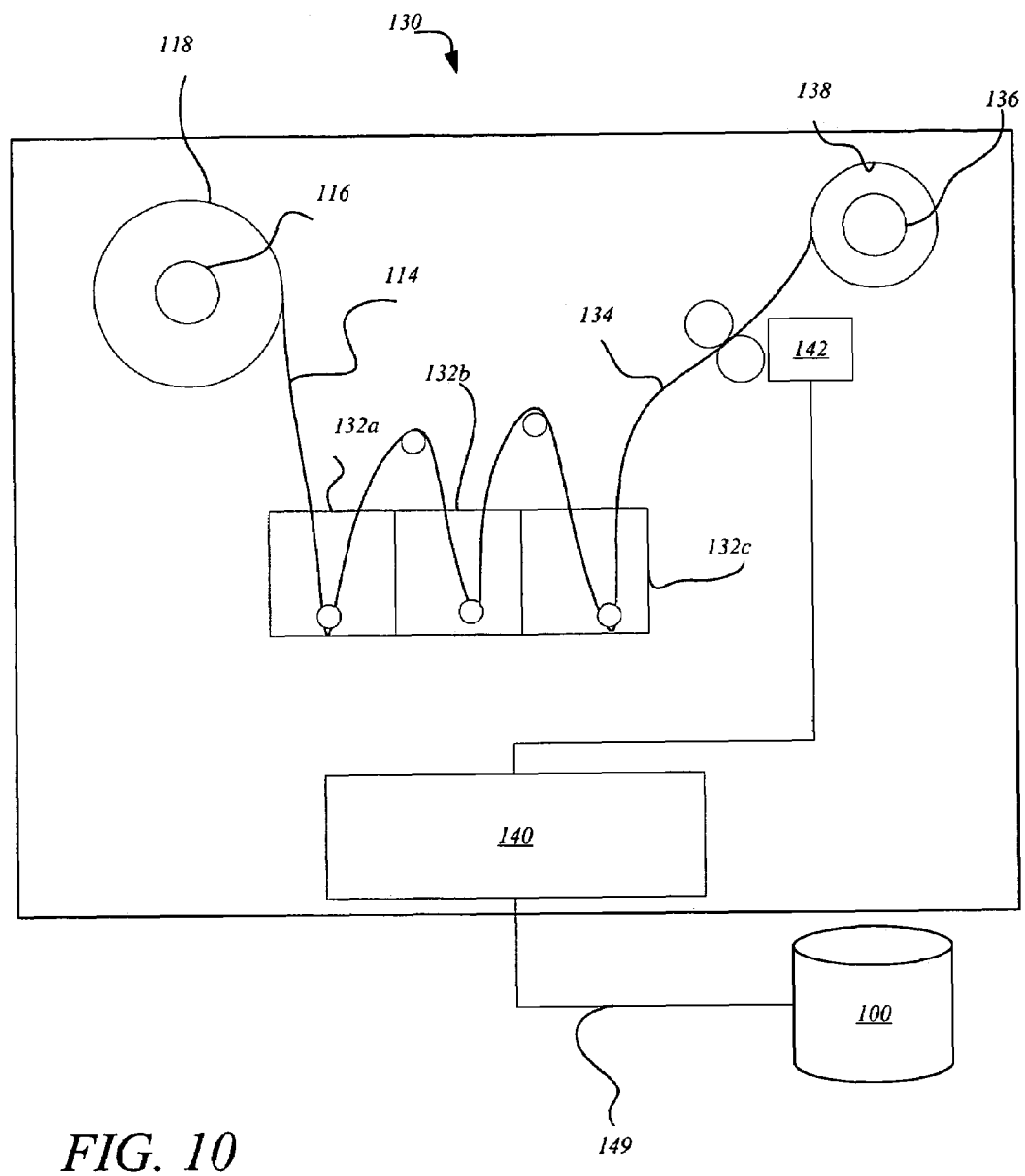
FIG. 10 is a block diagram showing a process for developing marked image film.

Referring to FIG. 10, there is shown a processor 130 that develops exposed marked film 114 to provide a developed film print 134. Generally speaking, processor 130 develops exposed marked film 114 in the same manner that was described above with respect to film processor 50, with exposed marked film 114 being passed through various baths such as a developer bath 132*a*, bleach bath 132*b*, and fixer baths 132*c*, and after these baths a developed film print 134 is dried. Processor 130 can also perform other conventional processes. After any processing, developed film print 134 can be provided on distribution cores 136 optionally, for subsequent assembly into one or more reels 138.

Processor 130 has a control logic unit 140 for ensuring that the tracking data follows the exposed marked film 114 through the development process. In this regard, control logic unit 140 operates an optical scanner 142 that reads tracking encodement 80 from developed film print 134 by passing a light onto a marginal area having the tracking encodement 80 and reading the tracking encodement 80 to obtain tracking data. The tracking data is obtained from tracking encodement 80, the tracking data is processed by processor control logic unit 140, and updated information is written to database 100 using the tracking data as a reference. Processor network connection 149 provides communication between processor control logic unit 140 and database system 100.

As noted above, where the tracking encodement 80 is formed in a way that allows for the tracking encodement to be read before development, processor control logic unit 140 can read the tracking encodement before development using a reader (not shown) adapted to read such an encodement and can use the tracking data to obtain other information from database 100 and can use this other information to adapt the printing process based upon specific characteristics of the marked film 74.

Figure 11:
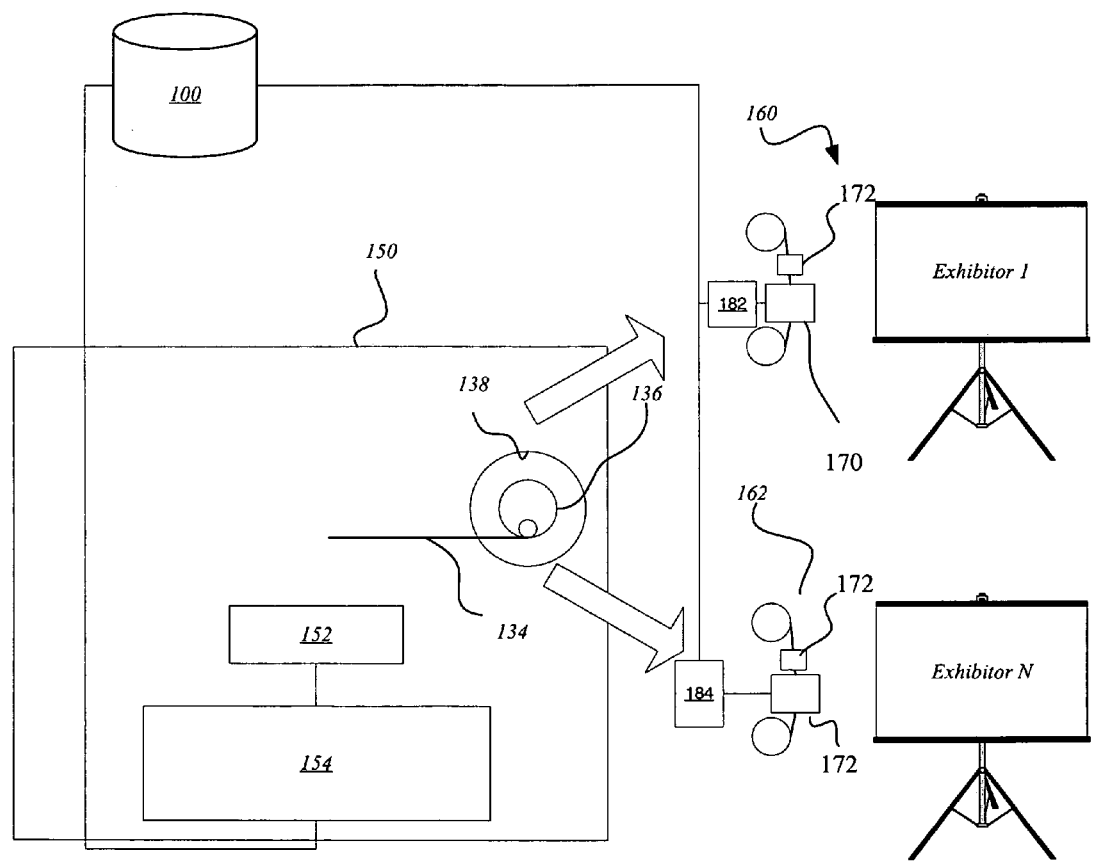
FIG. 11 is a block diagram showing use of the developed film at a distributor and exhibitors.

Referring to FIG. 11, there is shown the tracking process provided by film exchange distributor 150 prior to shipping distribution cores 136 or optionally distribution reel 138, having film print 134 to exhibitors 160. Here, control logic unit 154 operates an optical scanner 152 having a light source and a light reader that reads tracking encodement 80 to obtain tracking data from tracking encodement 80. Alternatively, distribution reel 138 can have a copy of the tracking encodement recoded thereon by the film processor so that the tracking encodement and tracking data can be obtained from the tracking encodement recorded on the film reel or on a tag, label or other packaging associated with the film reel. This alternative embodiment allows the tracking data to be obtained without requiring unspooling of the film print 134 from distribution reel 138.

Network connection 158 provides communication between control logic unit 154 and database system 100. Control logic unit 154 causes information obtained from distribution memory 144 plus any desired distribution information to be conveyed to database system 100 using this connection. Examples of this distribution data include, but are not limited to, shipping date, time, destination and delivery information.

Once the process shown in FIG. 11 is completed, sufficient information is available in database system 100 to associate a detect an identifying mark and to track the distribution of the film having that identifying mark to determine for example, that the print having that identifying mark was distributed to a specific distributor, and provided to specific exhibitors 160 and 162.

As is shown in FIG. 11, exhibitors 160 and 162 can also provide information to database 100 that can be used for tracking, projectors 170 and 172 at exhibitors 160 and 162 can read the tracking encodement using scanners 174 and 176 in projectors 170 and 172 during exhibition and can provide information to database 100 by way of a network interfaces 182 and 184 after use by exhibitors 160 and 162. Typically, motion picture film prints 134 are returned to the film exchange distributor 150. Returned motion picture films 134 can be scanned to obtain the tracking data stored in the tracking encodement and additional tracking information can be stored in database 100.

Tracking Data

In the embodiments described above, each film print has a tracking encodement with tracking data stored therein. This tracking encodement is available and can be read at various stages in film processing after the encodement has been recorded in a fixed form. For example, the tracking data contained within the tracking encodement can comprise a FILM ID code that identifies the film print. At various stages in the process of the formation and/or distribution of film print 134, the processing equipment provides FILM ID information and other information to database system 100. Database system 100 stores data that can be used for tracking purposes. For example, in this embodiment processor 130 receives a roll of exposed marked film 114 and determines the FILM ID for this film using, for example, optical scanner 92 to read the tracking encodement 80 after photofinishing. Processor 130 then provides database system 100 with the FILM ID and information indicating when exposed marked film 114 was processed to form film print 134 and identifying a distributor to which film print 134 was sent.

As noted above, where useful, processor 130 can also use the FILM ID to request information exposed marked film 114 from database system 100. This data can include information regarding the film characteristics or special processing instructions. In this embodiment, database system 100 organizes information about film print 134 based upon the FILM ID.

By way of example, and not by way of limitation, Table I lists some more detailed examples of the other data fields that can be associated with a marked print film 74 using the FILM ID in a database 100.

TABLE I

Data Fields

| Field | Description |
|---|---|
| Media segment number (e.g. FILM ID) | Identifier for each media segment. Encoded alphanumeric string. 1:1 correspondence with Identifying mark ID field. Example: A67G54423K |
| Film Print Title | A feature title. e.g. Nosferatu |
| Copy Number | Example: Copy 1 of 7000 of Nosferatu |
| Reel Number | Example: Reel 2 of 8 |
| Identifying mark ID | Identifier for identifying mark pattern. Proprietary code. 1:1 correspondence with Media segment number field. Example: 6646637727 |
| Manufacture date | Time stamp for date of media segment manufacture. Example: 020203143406GST |
| Emulsion batch identifier | Unique identifier for film emulsion. Manufacturer data. Example format: emulsion_id - roll# -slit_part# - strip# - perf_unit# Example: 2383-101-011 - unit - 01-01.1 |
| Print date | Time stamp for date of media segment printing. Example: 021203013140GST |
| Printer number | Identifier for printing apparatus 110. |
| Print vendor code | Unique identifier for third-party film lab. Example: AcmeLabs2331 Facility |
| Developer date | Time stamp for date of media segment development. Example: 021403011428GST |
| Developer number | Identifier for developer 120 process or chemical combination used. |
| Distribution date | Time stamp for date of media segment distribution to theater. Example: 022703191709GST |
| Exhibitor ID | Unique identifier for theater or other exhibitor. Example: UK31223ABGTN |

Security and Interlocks

In some applications, it is particularly important that a measure of security be provided for tracking information, whether stored using tracking encodement 80 or stored on database system 100. Access to stored tracking information should be permitted only after entry of suitable login account names and passwords. Information from database system 100 could be provided in encoded form, readable only to a requester who is in possession of a suitable decoding key, using techniques well known in the information security arts. Write access to database system 100 should be restricted in order to assure the integrity of any information stored in tracking encodement 80.

Using the method of the present invention, a system of interlocks can be designed so that, for example, image-recording media can be processed within processor 130 or used by exhibitors 160 and 162 only after accessing and verifying information contained within database 100. For example, distribution can be prevented where it is determined that a particular copy of film print 134 was sent to the wrong distributor 150. This could be used to help prevent unauthorized printing or to help prevent printing or processing under the wrong conditions, and/or to provide information that can be used to control the number of film prints 134 made from an original.

In another alternate embodiment, processing and exhibition equipment can be provided with mechanical or electrical interlocks so that these apparatuses do not process or exhibit any film that is not associated with a particular tracking encodement 80 or that has a tracking encodement 80 that shows evidence of tampering.

The invention has been described in detail with particular reference to certain preferred embodiments thereof, but it will be understood that variations and modifications can be effected within the spirit and scope of the invention.

Further, it will also be appreciated that while the above embodiments have been described with reference to an image-recording medium comprising a print film the methods described herein are equally applicable to other forms of image-recording mediums such as analog and digital video tapes, disks, and other forms of electronic and optical image-recording mediums.

Thus, what is provided is a method and apparatus for tracking the processing and distribution of image-recording media.

PARTS LIST

| | |
|---|---|
| 20 | media manufacturer |
| 21 | film fabrication |
| 22 | un-imaged print film |
| 23 | further film fabrication |
| 24 | core |
| 25 | distribution system |
| 26 | un-imaged print film rolls |
| 30 | studio |
| 32 | master copy |
| 34 | printing lab |
| 36 | printing apparatus |
| 38 | exposure head |
| 42 | source reel |
| 44 | take-up reel |
| 46 | exposed print film |
| 48 | imaged print film reel |
| 50 | film processor |
| 52 | baths |
| 52a | developer bath |
| 52b | bleach bath |
| 52c | fixer bath |
| 54 | developed print film |
| 56 | reel core |
| 58 | film reels |
| 60 | reel sides |
| 61 | marginal area |
| 62 | perforations |
| 63 | marginal area |
| 64 | film exchange |
| 65 | audio content |
| 66 | exhibitors |
| 67 | image receiving area |
| 68 | edge print |
| 70 | marking encoder system |
| 72 | identifying mark recorder device |
| 74 | marked print film |
| 76 | tracking encoder device |
| 79 | identifying mark |
| 80 | tracking encodement |
| 82 | magenta layer |
| 84 | cyan layer |
| 85 | yellow layer |
| 87 | marked print film reel |
| 88 | base layer |
| 90 | control logic unit |
| 100 | database system |
| 102 | identifying mark |
| 104 | identifying mark |
| 107 | tracking encodement |

-continued

PARTS LIST

| | |
|---|---|
| 108 | segment |
| 109 | tracking encodement |
| 110 | segment |
| 111 | printing head |
| 112 | printing apparatus |
| 114 | exposed marked film |
| 116 | exposed film core |
| 118 | exposed film roll |
| 120 | printer control logic unit |
| 122 | reader |
| 130 | processor |
| 132 | baths |
| 132a | developer baths |
| 132b | bleach bath |
| 132c | fixer bath |
| 134 | film print |
| 136 | distribution core |
| 138 | distribution reel |
| 140 | processor control logic unit |
| 142 | optical scanner |
| 149 | processor network connection |
| 150 | film exchange distributor |
| 152 | optical scanner |
| 154 | control logic unit |
| 156 | light source and a light reader |
| 158 | network connection |
| 160 | exhibitor |
| 162 | exhibitor |
| 170 | projector |
| 172 | projector |
| 174 | scanner |
| 176 | scanner |
| 182 | network interface |
| 184 | network interface |
| D | distance |

What is claimed is:

1. A method for fabricating an image-recording medium, the method comprising the steps of:
   determining segments for the image-recording medium;
   providing at least one identifying mark that identifies each segment of the image-recording medium with each identifying mark provided in an image recording area of the image recording medium;
   providing a tracking encodement having tracking data that identifies each segment, with each tracking encodement provided in an area of the image recording medium that is not used to record images; and
   storing information in a database that associates the tracking data in the tacking encodement with the identifying mark.

2. The method of claim 1, wherein the step of providing said identifying mark comprises steganographically encoding information content in a form that is not readily perceptible to an unaided human viewer.

3. The method of claim 1, wherein said image-recording medium comprises a photographic film.

4. The method of claim 1, wherein said image-recording medium comprises a photographic film and wherein at least one of the identifying mark and the tracking encodement is a latent image.

5. The method of claim 1, wherein said image-recording medium comprises a photographic film and wherein the at least one of the identifying mark and the tracking encodement is provided using a patterned colorant, dye, coating or thermal donor.

6. The method of claim 1, further comprising the step of storing, in the database, other information in association with a segment of an image recording medium with said other information organized into at least one data field.

7. The method of claim 6, further comprising the steps of receiving a request for said other information, said request incorporating tracking data and providing the other information to a recipient.

8. The method of claim 1, wherein the step of providing an identifying mark on the image-recording medium comprises providing more than one different identifying mark on the segment of image recording medium and wherein the step of storing information comprises storing information a database that associates each different identifying mark with a corresponding tracking encodement and tracking data so that the tracking data can be determined from any of the identifying marks.

9. The method of claim 1, further comprising the step of distributing at kast one segment of the image recording medium and storing information in the database in association with each segment that can be used to identify the recipient of the image recording medium.

10. A method for providing a segment of an image-recording medium, the method comprising the steps of:
    segmenting the image recording medium;
    providing at least one identifying mark that identifies each segment of the image-recording medium with each identifying mark provided in an image recording area of the image recording medium,
    providing a tracking encodement having tracking data that identifies each segment, with each tracking encodement provided in an area of the image recording medium that does not record images; and
    storing information in a database that associates the tracking data in the tracking encodement with the identifying mark;
    distributing the image recording medium;
    storing information in a database that associates the tracking data with at least one user to whom the medium is distributed.

11. The method of claim 10, wherein the identifying mark is not readable by the first user and the tacking encodement is readable by the a user, so that distribution of the image-recording medium can be tracked without reference to the identifying mark.

12. The method of claim 10, wherein the identifying mark is steganographically encoded in the image receiving area.

13. The method of claim 10, further comprising the steps of recording at least one additional identifying mark on each segment of the image recording medium, and storing information in the database that associates the tracking data stored in the tracking encodement recorded on the segment of the image-recording medium and the at least one additional identifying mark.

14. The method of claim 10, wherein at least one of the steps of providing identifying mark and providing the tracking encodement is performed by fabricating the image-recording medium to create at least one of the identifying mark and tracking encodement on the image-recording medium.

15. The method of claim 10, further comprising the steps of storing other information associated with the image recording medium in association with the tracking information and the identifying mark, receiving a request for the other information from any user of the image-recording medium said request having the tracking data therein, using the tracking data to obtain the other information from the database, and transmitting the other information to the requesting user.

16. The method of claim 15, further comprising the steps of receiving a signal from the first user containing user data and tracking data and storing the user data in the database in association with the tracking data.

17. An image recording medium having at least one segment with each segment having at least one unique identifying mark provided thereon in an image recording area thereof and a non-image-recording area having a separate unique tracking encodement.

18. The image recording medium of claim 17, wherein the unique tracking encodement does not provide information related to the unique identification mark, so that the tracking encodement does not provide information from which the characteristics of the identifying mark can be determined.

19. The image recording medium of claim 17, wherein the non-image recording area is capable of receiving data in the form of an optically recorded signal in the non-image recording area and wherein the tracking encodement is recorded in the non-image recording area in a manner that does not interfere with extraction of data from the optically recorded signal.

20. The image recording medium of claim 19, wherein the tracking encodement can be optically read despite the presence of the optically encoded signal.

21. The image recording medium of claim 19, wherein the tracking encodement is recorded using one color and wherein the optically recorded signal is encoded using another color.

22. The image recording medium of claim 19, wherein the image recording medium is formed using multiple color layers, with the tracking encodement being provided in at least one of the color layers.

23. The image recording medium of claim 19, wherein the image recording medium is formed using multiple color layers, with the tracking encodement being recorded in at least one of the color layers and the recorded data signal is recorded in a color layer that is not used for recording the tracking encodement.

24. The image recording medium of claim 17, wherein the image recording medium is formed using multiple color layers, with at least one of the layers is patterned to form at least one of the identifying mark and the tracking encodement.

25. The image recording medium of claim 17, wherein the identifying mark is recorded in a form that is not perceptible to a human viewer and the tracking encodement is recorded in a form that is human perceptible.

26. The image recording medium of claim 17, wherein the tracking encodement is made in a machine readable form.

27. The image recording medium of claim 17, wherein the identifying mark does not significantly distort the appearance of an image to be recorded in the image recording area.

28. An image-recording medium comprising:
    a film substrate organized into more than one segment with each segment having an image receiving area with a unique identifying mark encoded thereon and with each segment also having a unique tracking encodement recorded on an area of the film substrate that does not receive an image, wherein said tracking encodement having tracking data that can be read by users of the image-recording medium and used to assemble a record of the use of the image-recording medium.

29. The image-recording medium of claim 28, wherein said identifying mark comprises a steganographic encoding.

30. The image-recording medium of claim 28, wherein said tracking encodement comprises a latent image.

31. The image-recording medium of claim 28, wherein said tracking encodement comprises a latent image is recorded using one color layer of a multi-layer photosensitive film.

32. The image-recording medium of claim 28, wherein other information is recorded in another color layer and in an area of the photosensitive film that is at least in part coextensive with the tracking encodement.

33. An apparatus for forming an image-recording medium, the apparatus comprising:
an image recording medium fabrication system adapted to form an image recording medium said system comprising:
a marking encoder that provides a unique identifying mark on more than one segment of an image recording portion of the image recording medium;
a tracking encodement system that provides a unique tracking encodement having tracking data on each segment of the image recording medium; and
a controller that stores information in a database that associates the tracking data with the identifying mark.

34. The apparatus of claim 33, further comprising a tracking system that identifies a recipient to which the image recording medium is sent and stores data in the database system in association with the identifying mark that identifies the recipient, so that the recipient can be determined based upon the detected presence of the identifying mark in an image made from the image recording medium having the identifying mark.

35. The apparatus of claim 33, wherein the database system stores other information in the database that is related to the image-recording medium and provides the information during use of the image-recording medium.

36. The apparatus of claim 33, wherein the marking encoder encodes the identifying mark during fabrication of the film.

37. The apparatus of claim 33, wherein the marking encoder encodes the identifying mark by providing an image receiving layer of the image recording medium having an identifying mark formed thereby.

38. The apparatus of claim 33, wherein the marking encoder exposes the identifying mark onto the image recording area before a perforation is formed on the film.

39. An apparatus for providing an image-recording medium, the image recording apparatus comprising:
an image-recording medium fabrication system for forming the image-recording medium;
an identifying mark encoding system for recording a unique identifying mark in a human imperceptible form within a recorded image area on the image-recording medium; and,
a controller adapted to cause a tracking encoder to record a human perceptible tracking encodement from which tracking data can be determined, said tracking encodement being recorded on a portion of the image-recording medium that is not within an image recording area of the image recording medium,
wherein the controller further stores the tracking data with the identifying mark recorded in the image area in a database.

40. The image recording apparatus of claim 39, wherein the tracking encodement is optically recoded on a portion of the image recording medium that stores other information and wherein the tracking encodement and image information are stored using different colors.

41. The image recording apparatus of claim 39, wherein the tracking encodement is stored on a portion of the image recording medium that stores other information and wherein the tracking encodement and image information are stored as latent images in different layers of a multi-layer image recording medium.

42. The image recording apparatus of claim 39, further comprising a network connection adapted to receive signals from at least one user of the image recording medium containing data indicating a use to which the image recording medium has been put and wherein the controller stores the data.

43. The image recording apparatus of claim 39, further comprising a perforator for forming perforations in the image-recording medium.

44. The image recording apparatus of claim 39, wherein the image-recording medium has perforations thereon and wherein the controller causes at least one of the identifying mark or the tracking encodement to be recorded on the image recording medium in a manner that is synchronized with respect to the perforations.

45. The image recording apparatus of claim 39, wherein the controller determines the content of at least one of the identifying mark and the identifying mark.

* * * * *